No. 893,620. PATENTED JULY 21, 1908.
C. L. GARDNER.
TELESCOPING DEVICE.
APPLICATION FILED MAR. 28, 1907. RENEWED MAR. 2, 1908.
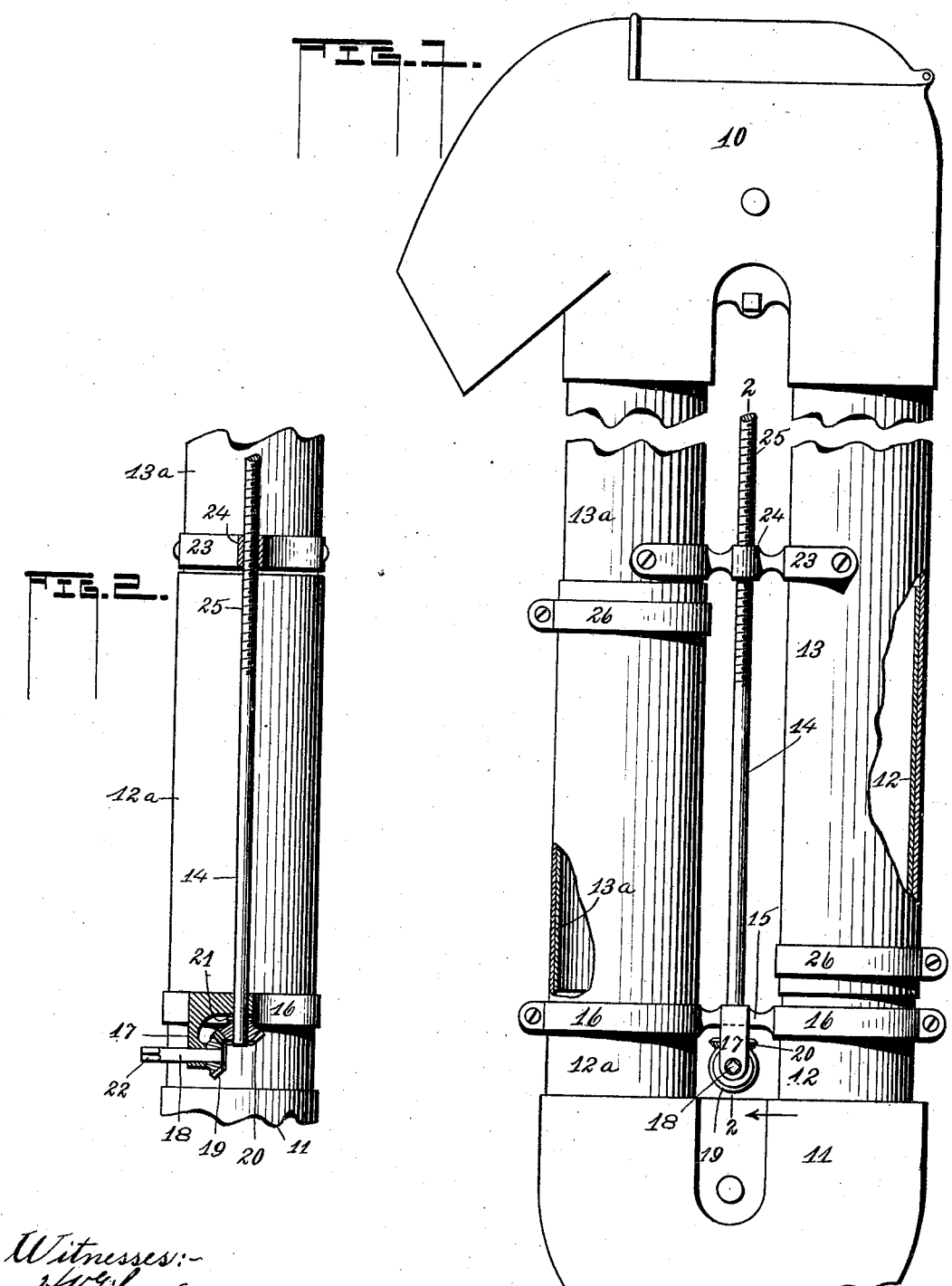
Witnesses:-
N. V. Gibson.
E. M. Giles
Inventor.
Charles L. Gardner
By N. V. Tefft, atty.

UNITED STATES PATENT OFFICE.

CHARLES L. GARDNER, OF PEORIA, ILLINOIS.

TELESCOPING DEVICE.

No. 893,620.  Specification of Letters Patent.  Patented July 21, 1908.

Application filed March 28, 1907, Serial No. 365,016. Renewed March 2, 1908. Serial No. 418,849.

*To all whom it may concern:*

Be it known that I, CHARLES L. GARDNER, a citizen of the United States, residing at Peoria, in the county of Peoria and State of Illinois, have invented certain new and useful Improvements in Telescoping Devices; and I do hereby declare that the following is a full, clear, and exact description of the invention, which will enable others skilled in the art to which it appertains to make and use the same.

This invention has reference more particularly to mechanism for telescoping the tubes of elevators and the object of my invention is to provide a simple screw mechanism for telescoping the tubes wherein a short screw may be employed.

In the accompanying drawings, which illustrate my invention, Figure 1 is a side view of an elevator embodying my improvements and Fig. 2 a sectional view on the line 2—2 of Fig. 1 looking in the direction indicated by the arrow.

This elevator is of the usual construction and has a head 10 and a boot 11 connected by a pair of tubular members through which the flights or buckets operate. The tube in which the flights move upwardly consists of the short section 12 which is connected to the boot and extends telescopically into the section 13 which is connected to the head, and the return tube in which the flights or buckets move downwardly consists of the tube 13$^a$ which is connected to the head 10, is of the same length as the tube 13 and extends telescopically into the section 12$^a$ which is connected with the boot 11 and is of the same length as section 12. Intermediate of the elevator tubes is the telescoping member 14 which is mounted at its lower end in the bracket 15 which is supported by the clamps 16 16 secured to the tubes 12 and 12$^a$ below the lower edge of the tube 13. These clamps 16 16 are adjustable lengthwise of the tubes 12 and 12$^a$ for purposes hereinafter specified, and the bracket 15 has the part 17 which carries the shaft 18 which projects outwardly between the tubes of the elevator at right angles to the telescoping member 14. This shaft 18 is provided at its inner end with the beveled gear 19, meshing with the beveled gear 20 which is secured in any suitable manner as by means of the pin 21 on the telescoping member 14, and the outer end of the shaft 18 is squared as at 22 to receive a crank whereby the shaft 18 and telescoping member 14 may be turned.

Secured to the tubes 13 and 13$^a$ above the upper edge of the section 12$^a$ is a bracket 23 which has the internally threaded sleeve portion 24 intermediate of the tubes which engages the threaded portion 25 of the telescoping member 14 so that when the telescoping member 14 is rotated, the tubes 13 and 13$^a$ are caused to move to and from their companion tubes 12 and 12$^a$. At the upper end of the section 12$^a$ and at the lower end of the section 13, said sections are provided with the bands 26 which may be clamped around the ends of said tubes for locking the ends of said tubes against the tubes which they inclose.

With the construction above described, it is unnecessary that the telescoping member 14 extend beyond the bracket 23, the entire length of extension of the elevator. The tubes 13 and 13$^a$ may be raised a portion of the length to which they may be extended, the clamps 26 tightened to hold the tubes in place and the clamps 16 loosened and drawn upwardly to the lower edge of the tube 13 by reversing the operation of the telescoping member 14. When the clamps 16 are drawn up to the lower edge of the tube 13, they may be tightened and locked onto the tubes, the clamps 26 loosened and the tubes 13 and 13$^a$ move upwardly as before.

What I claim is:

1. In an elevator, the combination with a parallel pair of upper tubes telescopically connected with a parallel pair of lower tubes, a screw intermediate of and parallel with the tubes, a shaft connected with said screw and extending angularly therefrom for rotating the screw, and a part secured to the upper pair of tubes and engaging the threaded portion of the screw whereby the said tubes are moved to and from their companion tubes when the screw is rotated.

2. In an elevator, the combination with a parallel pair of upper tubes telescopically connected with a parallel pair of lower tubes, of a bracket mounted on the lower pair of tubes and adjustable longitudinally thereof, a screw mounted on said bracket intermediate of said tubes and parallel therewith, a shaft connected with said screw and extending angularly therefrom for operating the screw and a part connected with the upper tubes engaging the threaded portion of the screw for moving the upper tubes to and from the lower tubes when the screw is rotated.

3. In an elevator, the combination of a parallel pair of upper tubes, a parallel pair of lower tubes, one of which said lower tubes extends telescopically inside one of the upper tubes and the other of which said lower tubes extends telescopically outside the other upper tube, a bracket clamped to the lower tubes and adjustable longitudinally thereof, a screw mounted on said bracket intermediate of said tubes and parallel therewith, a shaft connected with said screw and extending angularly therefrom for operating the screw, a bracket connected with the upper tubes engaging the threaded portion of the screw for moving the upper tubes to and from the lower tubes when the screw is rotated, and a clamp on the upper end of the outside lower tube and a clamp on the lower end of the outside upper tube for tightening the ends of said tubes against the inclosed tube.

In testimony whereof I have affixed my signature, in presence of two witnesses.

CHARLES L. GARDNER.

Witnesses:
E. M. GILES,
MARY E. COMEGYS.